United States Patent [19]

Young, Jr.

[11] 4,120,111

[45] Oct. 17, 1978

[54] ICE-FISHING TIP-UP

[76] Inventor: Russell L. Young, Jr., 424 Washington St., Boonton, N.J. 07005

[21] Appl. No.: 493,167

[22] Filed: Jul. 30, 1974

[51] Int. Cl.² ............................................ A01K 97/12
[52] U.S. Cl. ............................................................. 43/17
[58] Field of Search ......................... 43/17, 16, 17.2; 248/155.1, 155

[56] References Cited

U.S. PATENT DOCUMENTS

| | | | |
|---|---|---|---|
| 743,320 | 11/1903 | Otto | 248/155 |
| 2,448,346 | 8/1948 | Baugh et al. | 43/17 |
| 2,837,857 | 6/1958 | Ellison | 43/17 |
| 3,423,867 | 1/1969 | Bartletti | 43/17 |
| 3,453,767 | 7/1969 | Lake et al. | 43/17 |

*Primary Examiner*—Louis G. Mancene
*Assistant Examiner*—Daniel J. Leach
*Attorney, Agent, or Firm*—Thomas N. Neiman

[57] ABSTRACT

The tip-up has pivotally carried arms or limbs which telescope from a maximum, operative length to a stored, minimum length, to render the assembly a small, compact unit. Additionally, a reel is rotatably carried by the tip-up body, for pay-out and retrieval of line, and has a resilient element urged thereagainst which, cooperative with a reel locking cap, causes the locking cap to release the reel for free rotation in response to rotation of the reel in a line pay-out direction, the locking cap being provisioned for selectively restraining the reel against rotation.

4 Claims, 3 Drawing Figures

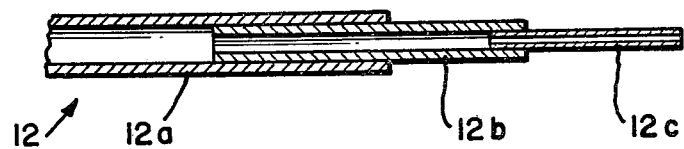
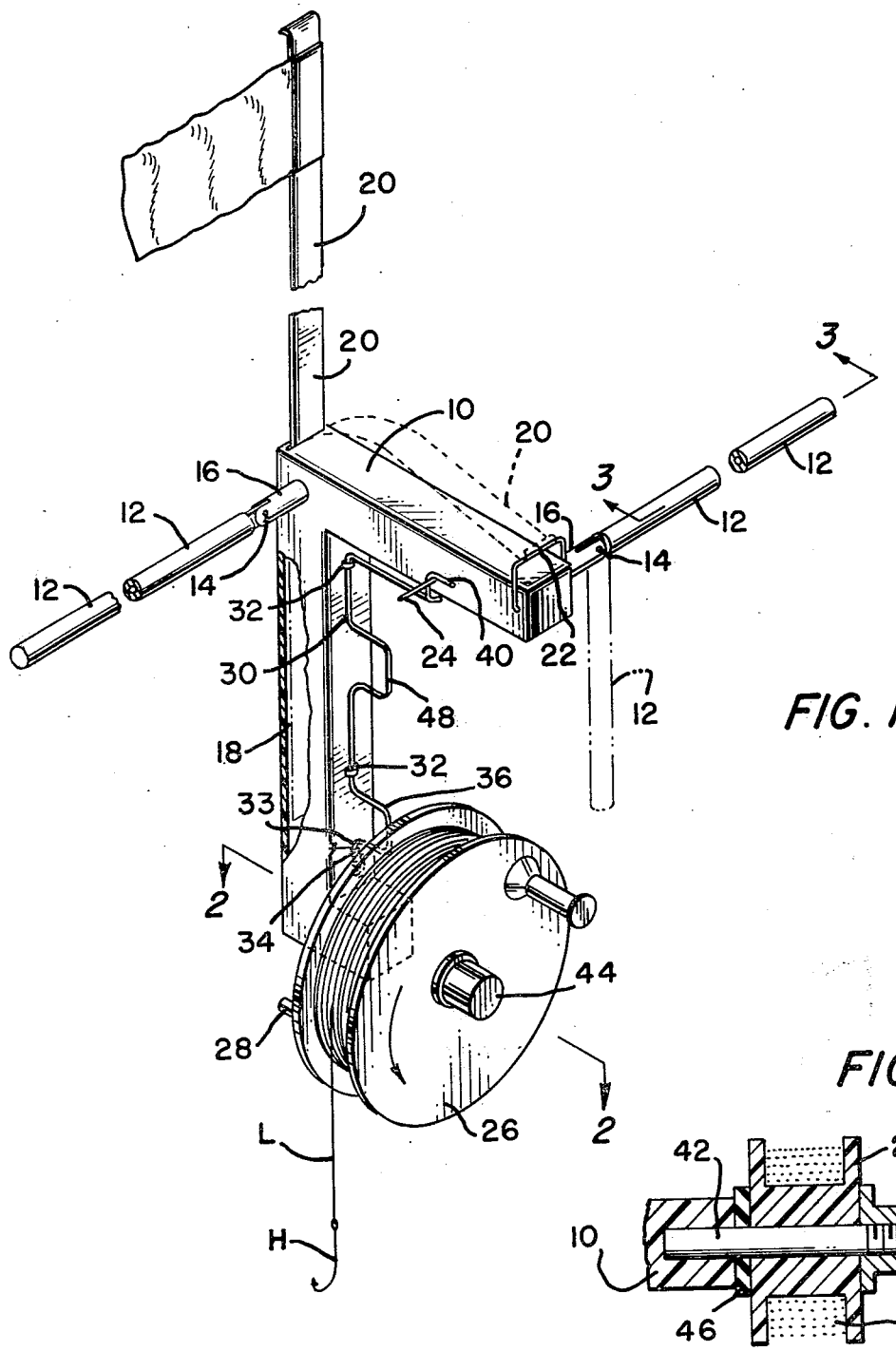

ICE-FISHING TIP-UP

This invention pertains to ice-fishing tip-ups, and in particular to such tip-ups which have means for selectively adjusting the reel thereof against rotation.

Ice-fishing tip-ups which are known from the prior art, typically have limbs or arms of fixed length. In order to provide an assembly of limited and transportable size, it is the practice to have the fixed length limbs pivotally coupled together, about an axial mid-point. Thus, the limbs can be slued apart, into right-angular, relative dispositions, to define crossed-limb supports. As efficient and compact this practice has been, it necessarily defines a "package" having a length of the axial dimensions of the limbs. Such packages are not readily carried; that is, they cannot be carried in a pocket with any facility. Rather, for being of such length, they must ordinarily be hand-carried to and from the ice-fishing site.

Too, some prior art ice-fishing tip-ups have means for selectively constraining the line-reel against rotation. That is, they have means carried by the reel-supporting shaft for adjusting the degree of free rotation which the reel will have. Typical of this latter practice is the "Tip-Up for Ice Fishing" disclosed in U.S. Pat. No. 2,448,346, issued Aug. 31, 1948, to R. N. Baugh et al. In this reference, a wing nut #29 is provided on a reel-supporting shaft for selectively adjusting the rotatable constraint of the reel. However, according to the teaching of this patent, the adjusted constraint, as selected, remains thus, even with pay-out of line from the reel. Possibly the constraint of the reel is increased with pay-out of line; this is not certain. The patent is silent as to the effect of the reel on the wing nut as pay-out occurs, yet the pay-out rotation is such as to cause a tightening of the wing nut, if there is any effect at all, but not a loosening thereof.

Clearly, it is desirable for line to be secured against a free pay-out thereof, and it is desirable to be able to adjust the degree of securing. But it is not desirable that this restraint be unalterable and unchanging as fish take lure and proceed to tension the line. On the contrary, it is to be preferred that, as fish take lure and tension the line, the line is released from the selected restraint imposed on the reel (against rotation).

It is an object of this invention, then, to set forth an improved ice-fishing tip-up which avoids the disadvantageous limitations, above-recited, which obtain in prior art tip-ups.

Particularly, it is an object of this invention to set forth an ice-fishing tip-up comprising a body; a reel for storage, pay-out, and retrieval of line; said reel being coupled to said body for rotation in one direction for line retrieval and for rotation in an opposite direction for line pay-out; a plurality of support limbs pivotally coupled to said body; a resilient, tip-up signalling indicator coupled to said body; means for holding said indicator in a non-signalling position; and means carried by said reel for releasing said indicator from said holding means; wherein said body has a support extending therefrom in cantilever fashion; said reel being rotatably mounted on said support; further including means coupled to said support for constraining said reel against rotation with a selective constraint; and resilient means urged against a surface of said reel for causing said constraining means to release its constraint of said reel in response to a rotation of said reel in said opposite direction.

It is an object of this invention, also, to teach an ice-fishing tip-up, comprising a body; a reel for storage, pay-out, and retrieval of line; said reel being coupled to said body for rotation; a plurality of limbs coupled to said body; a resilient, tip-up signalling indicator coupled to said body; means for holding said indicator in a non-signalling position; and means carried by said reel for releasing said indicator from said holding means; wherein said limbs of said plurality thereof each has a first, stored, minimum length, and a maximum, operative length, and includes means for selectively and infinitely extending and foreshortening said each limb within said minimum and maximum lengths.

A feature of this invention comprises a tip-up having pivotally carried limbs which telescope from a maximum, operative length to a stored, minium length, to render the assembly as a small, compact unit. A reel rotationally carried by the tip-up body has a resilient element urged thereagainst which, in cooperation with a reel locking cap, causes the cap to release the reel for free rotation, when the reel is rotated in a line pay-out direction The cap serves as a selective-restraint locking means for the reel.

Further objects and features of this invention will become more apparent by reference to the following description taken on conjunction with the accompanying figures, in which:

FIG. 1 is an isometric or perspective illustration of an embodiment of an ice-fishing tip-up according to the invention;

FIG. 2 is a cross-sectional view of the reel-mounting arrangement of the FIG. 1 embodiment, taken along section 2—2 of FIG. 1; and FIG. 3 a cross-sectional view of one of the limbs of the embodiment, the same being taken along section 3—3 of FIG. 1.

As shown in FIG. 1, an embodiment of the novel tip-up comprises a body 10 to which a pair of limbs 12 are pivotally joined at 14. Supports 16 fixed to the body carry the limbs 12, thereat, for pivotal movement — and parallel storage. The body has a rear spine in which is defined a track 18 for slidably receiving a portion of a flat-spring-type indicator 20 for storage as well.

Too, the body 10 has a clip 22 in which to receive a U-shaped termination of the indicator 20 during non-used or stored circumstances. A dowel 24 extends from the body 10 for receiving the U-shaped termination of the indicator, when the tip-up is prepared for use, as is explained in the ensuing text.

A line reel 26 is rotatably supported by the body 10, for pay-out, retrieval, and storage of line, and carries a extended actuator 28 operative for releasing the indicator from a triggered positioning to an indicating positioning. An actuating rod 30 is pivotally supported by the body 10 in staples 32 fixed to the body, with a terminal end of the rod pivotally set in the body at 33. A spring 34 fixed at one end in the body, and resiliently engaged with an actuating rod elbow 36, besides being enwrapped about the lowermost extremity of the rod, restrains the rod in the disposition shown. Accordingly, a dog-leg end 40 of the rod 30 is set in adjacency to the dowel 24 and against the body 10.

During storage, a portion of the indicator 20 is slidably confined within the body 10 in track 18, and the terminal end thereof is engaged with the clip 22 (as depicted in dashed-line illustration). For operative or triggering use, the terminal end of the indicator is engaged with the dowel 24, after the stored portion of the indicator 20 has been slidably withdrawn from the track 18.

As shown in FIG. 2, the reel 26 is rotatably carried on a shaft 42 which is fixed at one end in body 10 and is threaded at the other end thereof. The other end threadedly receives a locking cap 44 for selectively restraining the reel 26 against rotation. A rubber washer 46 is interpositioned between the reel 26 and body 10 for absorbing the locking cap restraint of the reel.

The limbs 12 are storable in a pivotally-disposed parallel position, as suggested by the dash-line illustration in FIG. 1, and are erected to extendable and operative positioning as shown in full-time illustration. Each limb 12 is telescopible, as FIG. 3 shows, in that each has a plurality of concentric tubular elements 12a, 12b, and 12c. Accordingly, each limb 12 has a stored or minimum length, and an extended, maximum length, and the telescoping arrangement of tubular elements 12a, 12b, and 12c enable the length-adjustment of the limbs therebetween. As the axial cross-sectional view, in FIG. 3, makes evident, each of the tubular elements 12a, 12b, and 12c has a uniform cross-section. The elements have constant inside and outside diameters, whereby they effect a uniform and concentric engagement with each other.

For operation, the U-shaped termination of the indicator is engaged with the dowel 24, after the full length thereof has been withdrawn from the track 18, with a desired length of line "L" suspended into the ice-hole. The limbs 12 are arranged, as shown in full-line illustration, for supporting the tip-up upon the surface of the ice, and in the ice-hole. The locking cap 44 is tightened against the reel 26 with a desired degree of restraint and the device is set up for catching fish.

Now, when fish take lure, or bait on the hook "H", the reel will be subject to tension on the line "L". The line will be made taut, and urge the reel to rotation, for line pay-out, in the rotation direction shown. As both the locking cap 44 and the reel shaft 42 have a right-hand thread, the resilient constraint of the rubber washer 46 will cause the locking cap to rotate with the reel. Accordingly, the cap 44 will unthread until it no longer restrains the reel, and the reel is freely rotatable on the shaft 42. Thus, the fish may run with the bait or lure, unrestrained. Of course, in the interim, in the manner well known in such devices, the actuator 28 will have deflected the elbow 36 to cause the dog-leg end 40 of rod 30 to release the indicator 20.

It is to be understood the reel 26, in its pay-out rotation, through the resilient urging of the rubber washer 46, unthreads the locking cap 44, to enable the adjustably "locked" reel 26 to freely pay-out line. It remains, then, for the user of the tip-up to note the erect indicator 20, and to abruptly halt the pay-out of line and play-in the fish.

While I have described my invention in connection with a specific embodiment thereof, it is to be clearly understood that this is done only by way of example and not as a limitation to the scope of my invention as set forth in the objects thereof and in the appended claims.

The washer 46 is shown in-board of the reel 26. Clearly, with the same inventive effect, it could be placed out-board between the locking cap 44 and the reel 26. Too, a pair of washers disposed at opposite ends of the reel could be employed.

On retrieving line, by rotating the reel in the contrary direction to that indicated by the arrow in FIG. 1, it is necessary to move rod 30 out of the way of the reel-carried actuator 28. For this purpose, I provide a U-shaped portion 48 in rod 30. Simply by pivoting rod 30 ninety degrees of arc to the left (per the view in FIG. 1), elbow 36 will be removed from possible engagement with actuator 28, and line retrieval can proceed. Patently, other such finger-tabs, like that of U-shaped portion 48, there or elsewhere on rod 30 could be used.

Further, I show the body 10 as a somewhat C-shaped component having a vertical spine with a pair of horizontal limbs or arms. While this is a preferred embodiment, others can be devised. Simply, I show an embodiment of my invention for exemplary purposes. However, my teaching comprises those embodiments which will occur to those skilled in the art who take instruction from my disclosure and which embodiments fall within the ambit of my claims.

I claim:

1. An ice-fishing tip-up, comprising:
a body;
a reel for storage, pay-out, and retrieval of line;
said reel being coupled to said body for rotation in one direction for line retrieval and for rotation in an opposite direction for line pay-out;
a plurality of support limbs pivotally coupled to said body;
a resilient, tip-up signalling indicator coupled to said body;
means carried by said body for holding said indicator in a non-signalling position; and
means carried by said reel and said body cooperative for releasing said indicator from said holding means; wherein
said body has a support extending therefrom in cantilever fashion;
said reel is rotatably mounted on said support;
said support is threaded; and further including
means for securing said reel on said support; wherein
said securing means is threaded for threadedly engaging said support;
said securing means, upon being threadedly engaged with said support and torqued, with a selective force, in said one direction, is urged against a surface of said reel for adjustably constraining said reel against rotation with a selective constraint; and
said constraint-effecting securing means, responsive to a forced rotation of said reel in said opposite direction, also rotates in said opposite direction to immediately and incrementally release said selective constraint of said reel.

2. An ice-fishing tip-up, according to claim 1, wherein:
said securing means comprises a resilient element interposed between said reel and said body.

3. An ice-fishing tip-up, according to claim 1, wherein:
said indicator comprises an elongate, flat spring; and
said body has means supporting said spring for slidable movement thereof relative to said body.

4. An ice-fishing tip-up, according to claim 3, wherein:
said spring supporting means comprises means for storably enclosing a portion of said spring.

* * * * *